Patented July 26, 1932

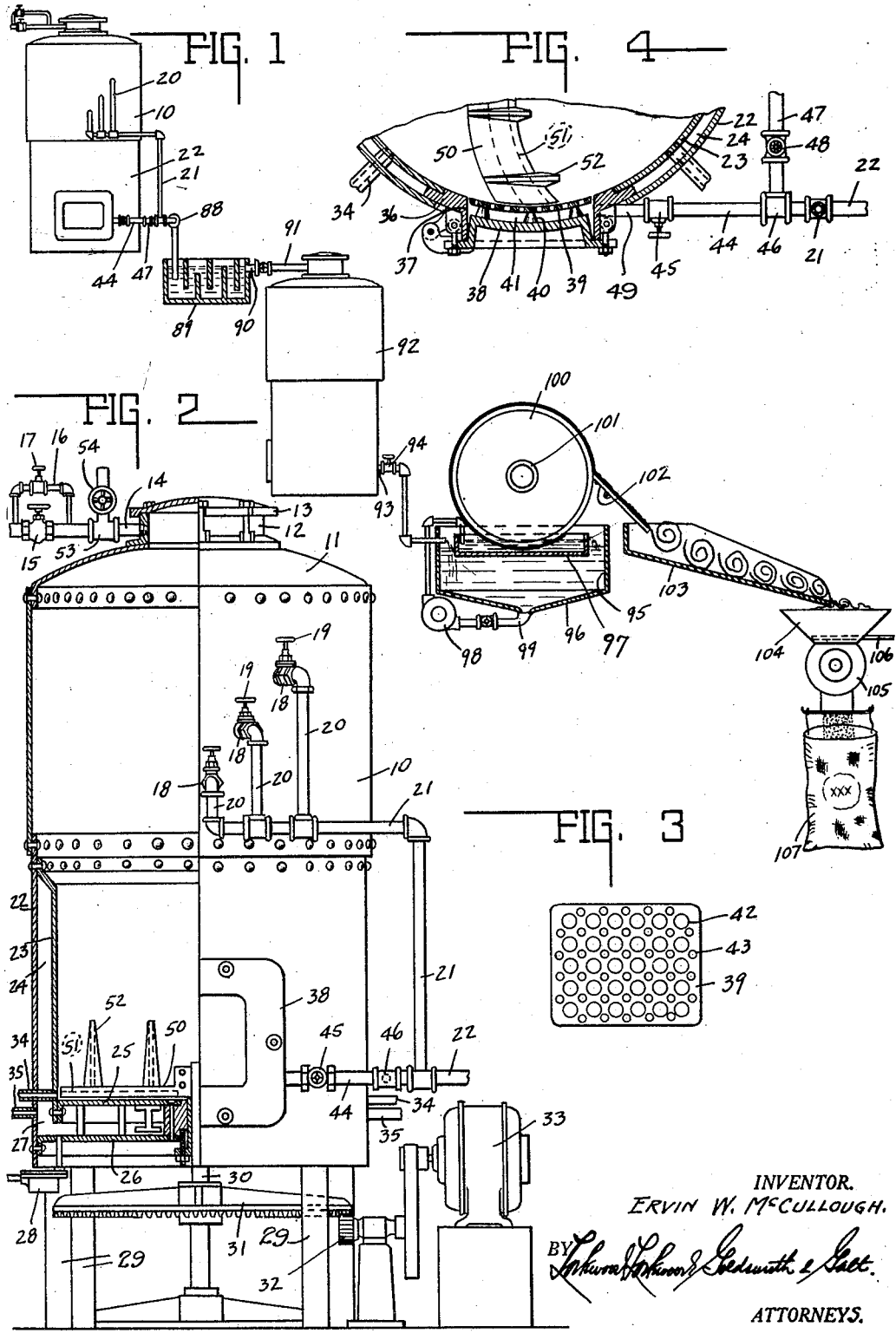

1,868,669

UNITED STATES PATENT OFFICE

ERVIN W. McCULLOUGH, OF INDIANAPOLIS, INDIANA

COOKED GARBAGE LIQUOR SOLID AND PROCESS OF FORMING SAME

Original application filed March 10, 1924, Serial No. 698,106. Divided and this application filed March 25, 1929. Serial No. 349,740.

This invention relates to the transformation of liquor from cooked garbage into substantially solid form.

The chief object of this invention is to produce from a liquor derived from cooked garbage prior to any subsequent treatment of the tankage thus formed by said cooking, a solid component that is edible, palatable, wholesome and nutritious in addition to the free grease normally removable with said liquor.

This application is a division of the co-pending application entitled "Products from ordinary garbage and process of preparing same" filed March 10, 1924, and bearing Serial No. 698,106, which in turn is a continuation in part of a co-pending Patent No. 1,812,108, dated June 30, 1931 entitled "Garbage reducer."

The chief feature of the invention consists in the dehydration of the molasses-like substantially greaseless concentrate with a resulting formation of a solidified product that is in such form as to permit ready manipulation such as grinding, or the like, permitting subsequent handling, such as for example, mixing with mill feeds and the like, for animal food.

The full nature of the invention will be more fully understood from the accompanying drawing and the following description and claim:

In the drawing Fig. 1 is a diagrammatic plan of apparatus suitable for practicing the process and producing the product. Fig. 2 is an elevational view of a cooker for producing the liquor. Fig. 4 is a transverse section through the door opening of the tank. Fig. 3 is an elevational view of the straining plate carried by the door.

Briefly, the process consists of loading a unit with city garbage material which may be and preferably is substantially drained of its free water content, adding thereto a small amount of clean water, and thereafter cooking under pressure the garbage material in said unit. After the material has been cooked to the desired degree, said cooking is discontinued, the pressure within the unit reduced, and the charge is permitted to settle. The aforesaid settling occurs progressively from the top toward the bottom. To expedite the substantial separation of the charge into its component parts, to wit, the liquor and the solids components, the liquor in the top of the tank from which the solids have settled progressively is drawn off and conveyed to a suitable degreasing apparatus. This decantation separation is continued until substantially the entire liquor content collected above the solids content in the unit has been removed from said unit.

The solids content in the unit is further drained following the decantation previously described, and the time necessary for said drainage is materially reduced by performing the same under pressure.

This liquor after passing through any suitable apparatus for removing the free grease therefrom, such as a baffle box, is conveyed to an evaporator which removes a considerable portion of the water content of said liquor and forms a molasses-like product. This product is then subjected to further dehydration by any suitable means which will produce a product, which when cooled and under normal atmospheric conditions is a brittle, taffy-like product. This product is substantially free from grease and contains less than ten per cent of moisture. It can be ground or pulverized in any suitable mill and is a product suitable for a conditioner or food, particularly for animals and fowls. Following decantation and drainage the solids content in the tank is disintegrated and then mechanically discharged from the cooker. After cooling the solid material is further operated upon as set forth in the before-mentioned co-pending application.

A cooker suitable for cooking city garbage or the like, to produce tankage which may be used for fertilizer after being degreased may be used. The present device used to produce a tankage of a different character suitable for feed may also be used and includes a boiler shell 10 surmounted by a head 11 having a neck 12 closable and sealable by a cover 13. Communicating with the neck is a pipe 14 controlled by a valve 15. By-passing said valve 15 is the by-pass 16 including a valve 17. The shell 10 includes a plurality of outlets 18. These outlets preferably are arranged at different levels, and likewise preferably are arranged offset from each other. Each outlet 18 is controlled by a valve 19 which communicates with a pipe 20. All of the pipes 20 in turn communicate with a pipe 21 and which in turn communicates with a pipe 22. The foregoing constitutes substantially the upper half of the tank or unit. The lower portion of the unit, and herein the same is shown substantially equal in height to the upper portion 10, is formed of a pair of concentric shells 22 and 23 forming an annular chamber 24 therebetween. The shell 23 includes a bottom 25 and the shell 22 includes a bottom 26, said bottoms being spaced from each other to form a space 27 which herein is shown in free communication with the annular space 24. Communicating with the chamber 27 and adapted to drain the same is a trap 28.

The aforesaid construction is suitably supported by the standards 29 or equivalent means, and extending through the chamber 27 is a shaft 30 that terminates in an agitating construction positioned within and preferably near the lower portion of the lower chamber in the tank. The particular construction of this agitating element will be described hereinafter. Herein a conventional drive for the shaft 30 is shown and includes a gear wheel 31 driven by a pinion 32 in turn driven by a source of power, such as an electric motor 33.

At conveniently located points, and herein the same are shown in spaced and opposite relation about the periphery of the tank, there are provided conduits or pipes 34, which communicate with the interior of the shell 23 or lower chamber formed thereby. These pipes or conduits 34 are connected to a suitable source of steam supply and are adapted to discharge steam into the tank or unit for cooking purposes. Also there is provided a plurality of pipes or conduits 35 which herein are shown communicating with the chamber 24 formed within the shell 22 and between said shell and the inner shell 23. These pipes 35 are adapted to supply a heating medium such as steam to the chamber 24 for heating the contents of the chamber formed within the shell 23 or lower portion of the tank. The number of these pipes may be varied as found necessary or desirable. It is to be understood, of course, that the pipes 34 and 35 are suitably controlled by any control means such as valves or the like.

Positioned in the shells 22 and 23 is a door frame 36 provided with an opening 37 that permits access to be had from without the shell 22 to the interior of the shell 23. Suitably positioned in the opening 37 and suitably supported and secured adjacent thereto is a door 38. This door 38 does not conform to the inner periphery of the chamber or a continuation thereof of the shell 23, but is offset therefrom in the opening 37. There is provided, however, a plate 39 which herein is shown as forming substantially a continuation of the shell 23 and conforming to said periphery to form a complete cylinder therewith. Thus, no pocket is formed within the shell 23. The plate 39 is shown suitably supported by the lugs 40 which extend inwardly from the door or closure 38 and thereby form between the plate 39 and the door closure 38 and the enclosing walls of the opening 37 a chamber 41 having restricted communication with the chamber formed within the shell 23 at all times when the door is closed. The plate 39 is shown provided with a suitable number of relatively large size apertures or holes 42 and the remainder of the plate portion is further apertured by a plurality of smaller apertures 43. The size of these apertures is such that the plate is adapted to restrain or support the contents positioned within the shell 23 and retain the same in said shell but permit restricted communication between the chamber formed within said shell and the chamber 41. The sizes and numbers of the perforations may be varied as found necessary or desirable.

A pipe 44 controlled by a valve 45 extends through the door frame 36 and communicates with the chamber 41 in turn having normally restricted communication with the interior of the shell 23. The pipe 44 is shown connected by a T 46 in turn connected by one branch to the pipe 22, and by another branch to a pipe 47, including a valve 48. The pipe 47 terminates in a conduit 49 that is positioned oppositely from the door opening 37, and said pipe 49 communicates with the chamber formed within the shell 23.

Extending radially from the axial center of the tank and positioned adjacent the bottom 25 thereof is a plurality of agitating arms 50. These arms 50 are curved and preferably are curved rearwardly with respect to the direction of rotation. Herein a pair of such arms is illustrated and these are positioned in opposite and spaced relation with respect to each other. The under face of each arm includes a channel 51 that extends from near the pivotal support thereof to the free end thereof, terminating relatively close the shell 23. Each arm 50 supports one or more blades 52 which project upwardly from said arms. Herein there is illustrated a plurality of blades for each arm positioned in spaced relation with each other, so that they do not travel in the same path, but preferably in intermediate paths. These blades are shown tapering upwardly and forwardly to form an inclined front face. This inclination tends to keep the material from settling during the drying operation.

Likewise the taper of the front face of the arms assists in the same operation. The passage of the blades through the material further disintegrates the readily reducible but not the rubbish material. The arms 50 are suitably connected to the shaft 30 for rotation thereby, and there is also provided suitable means associated with said connection, whereby a pressure and leak-proof bearing is secured. These arms are normally positioned as shown in Fig. 2 when stationary. Cooking of the garbage therein may be by any desired or preferred process.

The cooked charge settles and by gravity the solids content gradually collects in the lower portion of the tank and the liquor content of the charge collects thereabove. To expedite the removal of the separated liquor from the tank, and since such separation occurs progressively from the top toward the bottom of the charge, the uppermost outlet 18 is connected to the pipe 21 by opening the valve 19 controlling the former. The separated liquor above the level of the uppermost outlet 18 thereupon flows by gravity through the pipe 21 to a suitable collector unit. By the time that the separated liquor above the level of the uppermost outlet 18 has been removed from the tank, the liquor between said level and the level of the next lower outlet 18 will have become substantially free from all of the solids content. The valve 19 controlling the latter outlet is thereupon opened and the separated liquor thereabove is likewise permitted to discharge to the same collector unit. This operation is repeated until the lowermost valve 19 has been opened and the separated liquor above the level of the same has been drained from the tank.

Following the aforesaid decantation, or simultaneously therewith, either or both of the valves 45 and 48 may be opened for draining the liquor in the bottom of the tank from the same into the same collector unit. When gravity drainage has been substantially completed, and when necessary, all of the valves 19 are closed and pressure is applied through the line 14 by means of the pressure branch 53 controlled by valve 54. The application of pressure gradually forces the liquor content not separated from the solids content by the previously described gravity separation, downwardly through the solids content and outwardly through the pipe 49 and the pipe 44 to the collector unit. Such separation is facilitated by the collection of the liquor in the bottom and its drainage to the aforesaid outlets through the channels 51 in the arms 50, which are so positioned that said channels readily communicate with the before-mentioned outlets. It has been determined that substantially the entire pressure drainage previously described passes through the drainage plate 39.

The liquor decanted from the tank through the several conduits 20 discharging into the line 21 and drained from the tank through the conduits 44 and 47 is the garbage liquor secured from the cooking process. Herein the pipe 21 and pipes 47 and 44 discharge into a header 88 which may also be connected to similar conduits of similar units. The header 88 discharges into a suitable degreasing apparatus which herein is shown in the form of a baffle box type grease separator 89 which discharges by suitable means through a conduit 90 into a conduit 91 discharging into an evaporator 92. The evaporator 92 is provided with an outlet 93 controlled by a valve 94. Any suitable evaporator or concentrator may be utilized, but one which is provided with a contents circulator or agitator is preferred. This evaporator, as its name indicates, is adapted to remove a considerable portion of the water content from the liquor. The resultant produce is molasses-like in character and is discharged through the outlet 93 controlled by the valve 94. This molasses-like product includes a moisture content of approximately thirty to forty per cent.

The molasses-like product discharges into a suitable receptacle or container 95 herein shown provided with a hopper-like bottom 96. A tray 97 is also shown associated therewith, and herein a pump 98 is connected by a valve controlled line 99 with said tray 97 for maintaining a predetermined level of molasses-like product in said tray 97. Positioned adjacent, and herein above the tray 97, and with a portion of its periphery positioned therein, is a heated drying drum 100 having the heat supplying means 101 thereing. A drum which has operated satisfactorily has had the following approximate dimensions, about 4 feet in diameter and about 12 feet in length, and this drum has a shell approximately an inch thick and is rotated at a speed of about 12 revolutions per hour. The foregoing figures are merely given for the purpose of description and are in no sense to be considered as limitations. Adjacent the surface of the drum is a plate 102 which is adapted to scrape from said surface the product which has been dried thereon. The material is, of course, hot when removed from the roll by the scraper and very closely resembles hot taffy candy. This material is permitted to cool and is conveyed by suitable means to a mill. Herein such a means illustrated includes the chute 103 and the hopper of the mill is indicated by 104; the mill proper being indicated by the numeral 105. A valve 106 controls the discharge from the hopper to the mill, and the discharge from the mill is adapted to be collected into a sack 107. The material when discharged from the roll and prior to grinding, when cool, is very brittle and resembles cold taffy candy. Under normal atmospheric conditions, it is relatively hygroscopic in character, and when exposed to the aforesaid conditions for several days will gradually reassume its relatively plastic form.

The garbage liquor decanted and drained from the unit varies from a dark brown to a deep wine color, depending upon the original constituents in the garbage. The garbage, such as ordinarily secured from cities in the summertime is relatively low in animal content, although not necessarily so, for there may be an abundance or excess animal matter. The garbage in the winter normally has a higher animal content than in the summer, due to an increased meat consumption by the population. The grease separated from the liquor varies from a cream to a dark brown color and the molasses-like product is usually very dark brown or almost black. The taffy-like product when ground may vary anywhere from a deep yellow to a light brown.

The moisture content of the products is less than ten per cent, while the protein content is comparatively high, which gives the product a high food value. The ash content, is in the neighborhood of ten per cent which indicates a favorable condition when it is noted that present practice in hog feeding indicates that hogs whose corn diet is supplemented with mineral mixtures gain weight more rapidly than those fed on a straight corn diet. The acidity, generally reported as lactic acid, is comparatively high. This is one of the conditioning factors in the product and may replace milk conditioning. The starch, dextrin and sugar content is comparatively high, indicating that the product has additional food and conditioning value. The ground or pulverized taffy-like product can be very easily mixed with cereal feeds. It apparently has a very palatable taste and is very attractive to hogs, cows, horses and similar animals.

The taffy-like product secured from the liquor is substantially free from all household poisonous substances or toxic agents that may be present or develop in garbage. The acid reaction which the product invariably has indicates that the alkalies that originally may have been present in the household garbage such as for example that resulting from the use of cleaning powders, have been neutralized and are no longer present in toxic form. The duration of cooking and the temperature and pressure at which the same takes place effectually disposes of all undesirable products of decomposition so that the finished product from a bacteriological standpoint is absolutely safe for feeding purposes.

From the foregoing, therefore, it will be apparent that the garbage obtained from a city can be processed in a sanitary manner to produce, to wit, free grease, the taffy-like product which may be ground or pulverized and a tankage which may be subjected to a solvent treatment for removing the entrapped grease and the residue made into fertilizer or which with the present cooker may be mechanically handled to form a safe animal feed and a tailings component that is likewise suitable for a fertilizer. The ground taffy-like product may be mixed with mill feeds or the like for rendering the same more palatable, more nutritious and more wholesome.

The invention claimed is:

In a garbage treatment process for forming a molasses substitute for animal feed comprising the successive steps of forming a substantially greaseless cooked garbage liquor, evaporating the liquor to molasses-like consistency, applying the molasses-like product to a heated surface for dehydration to solidification, scraping the solidified product from the surface, grinding the solidified product, and then intimately mixing the ground product with the other feed producing products.

In witness whereof, I have hereunto affixed my signature.

ERVIN W. McCULLOUGH.